United States Patent
Harandi et al.

(10) Patent No.: US 9,964,256 B2
(45) Date of Patent: May 8, 2018

(54) CONVERSION OF ORGANIC OXYGENATES TO HYDROCARBONS

(71) Applicants: Mohsen N. Harandi, The Woodlands, TX (US); Timothy L. Hilbert, Middleburg, VA (US); Suriyanarayanan Rajagopalan, Spring, TX (US); Stephen J. McCarthy, Center Valley, PA (US); Rohit Vijay, Bridgewater, NJ (US)

(72) Inventors: Mohsen N. Harandi, The Woodlands, TX (US); Timothy L. Hilbert, Middleburg, VA (US); Suriyanarayanan Rajagopalan, Spring, TX (US); Stephen J. McCarthy, Center Valley, PA (US); Rohit Vijay, Bridgewater, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days. days.

(21) Appl. No.: 14/962,300

(22) Filed: Dec. 8, 2015

(65) Prior Publication Data

US 2016/0178132 A1    Jun. 23, 2016

Related U.S. Application Data

(60) Provisional application No. 62/095,188, filed on Dec. 22, 2014.

(51) Int. Cl.
C07C 1/20     (2006.01)
C07C 5/02     (2006.01)
(Continued)

(52) U.S. Cl.
CPC ............... *F17D 1/16* (2013.01); *C10G 3/45* (2013.01); *C10G 3/47* (2013.01); *C10G 3/49* (2013.01);
(Continued)

(58) Field of Classification Search
CPC ................................. C07C 1/20; C07C 5/02
(Continued)

(56) References Cited

U.S. PATENT DOCUMENTS 3,702,886 A    11/1972   Argauer et al.
3,709,979 A     1/1973   Chu
(Continued)

FOREIGN PATENT DOCUMENTS

WO    2014/008337 A1    1/2014

OTHER PUBLICATIONS

The International Search Report and Written Opinion of PCT/US2015/064435 dated Jun. 13, 2016.

*Primary Examiner* — Thuan D Dang
(74) *Attorney, Agent, or Firm* — Liza Negron

(57) ABSTRACT

In a process for the catalytic conversion of organic oxygenates to hydrocarbons, a feed comprising at least one organic oxygenate is contacted with a zeolite catalyst under conditions effective to produce a hydrocarbon product comprising aromatics, olefins and paraffins. At least a fraction of the hydrocarbon product containing $C_{4+}$ hydrocarbons, including at least part of the olefins, is then contacted with hydrogen in the presence of a hydrogenation catalyst under conditions effective to saturate at least part of the olefins in the $C_{4+}$-containing fraction and produce a hydrogenated effluent containing less than 1 wt % olefins. The hydrogenated effluent is useful as a diluent for heavy crude oils.

21 Claims, 1 Drawing Sheet

(51) Int. Cl.
*F17D 1/16* (2006.01)
*C10G 3/00* (2006.01)
*C10G 45/00* (2006.01)

(52) U.S. Cl.
CPC ....... *C10G 45/00* (2013.01); *C10G 2300/302* (2013.01); *C10G 2300/308* (2013.01); *Y02E 60/34* (2013.01); *Y02P 30/20* (2015.11)

(58) Field of Classification Search
USPC ................ 585/319, 324, 275–277, 639, 640
See application file for complete search history.

(56) References Cited

U.S. PATENT DOCUMENTS

| | | |
|---|---|---|
| 3,832,449 A | 8/1974 | Rosinski et al. |
| 3,894,102 A | 7/1975 | Chang et al. |
| 3,894,104 A | 7/1975 | Chang et al. |
| 3,899,544 A | 8/1975 | Chang et al. |
| 3,904,916 A | 9/1975 | Emidy et al. |
| 3,931,349 A | 1/1976 | Kuo |
| 3,969,426 A | 7/1976 | Owen et al. |
| 4,015,215 A | 4/1977 | Haag et al. |
| 4,016,245 A | 4/1977 | Plank et al. |
| 4,076,842 A | 2/1978 | Plank et al. |
| RE29,948 E | 3/1979 | Dwyer et al. |
| 4,234,231 A | 11/1980 | Yan |
| 4,304,951 A * | 12/1981 | Garwood ............... C10G 45/44 585/469 |
| 4,533,462 A * | 8/1985 | Billon .................... C10G 9/007 208/107 |
| 4,556,477 A | 12/1985 | Dwyer |
| 4,582,815 A | 4/1986 | Bowes |
| 8,686,206 B2 | 4/2014 | Fang et al. |
| 2011/0112345 A1 | 5/2011 | Chewter et al. |
| 2013/0096358 A1* | 4/2013 | Lai .......................... C07C 2/864 585/407 |

\* cited by examiner

CONVERSION OF ORGANIC OXYGENATES TO HYDROCARBONS

CROSS-REFERENCE TO RELATED APPLICATIONS

This application claims the benefit of provisional U.S. Ser. No. 62/095,188, filed Dec. 22, 2014, the entire contents of which are expressly incorporated by reference herein.

FIELD OF THE INVENTION

This invention relates to a process for converting organic oxygenates to hydrocarbons.

BACKGROUND

It is well known that organic oxygenates, particularly methanol and dimethyl ether, can be converted to a wide range of hydrocarbons, including aromatics, olefins and paraffins, over a special class of crystalline aluminosilicate zeolite catalysts of which H-ZSM-5 is the most preferred. The process is generally referred to as the MTG process at least partly because the hydrocarbon product has a high octane value and is useful as a gasoline blending stock. The MTG process is described in many patents and publications, including U.S. Pat. Nos. 3,931,349; 3,969,426; 3,899,544; 3,894,104; 3,904,916; and 3,894,102; the disclosures of each of which are incorporated by reference.

U.S. Pat. No. 4,304,951 describes a process for hydrotreating a 200-400° F.+ bottoms fractions resulting from conversion of methanol to gasoline in order to decrease the durene content of the bottoms fraction and produce distillate.

There is, however, continuing interest in developing new applications for the hydrocarbon product of the MTG process, particularly at sites which have a plentiful supply of natural gas which can be converted to the methanol and dimethyl ether feedstocks of the MTG process. In addition, there is growing interest in developing processes which allow greater flexibility in the final product slate of the MTG process according to site needs and customer demand.

SUMMARY

According to the present invention, it has now been found that by hydrotreating a broad fraction of the MTG effluent, containing at least some of the $C_{4+}$ component, it can be possible to saturate most or all of the olefins in the effluent, with or without significant saturation of durene and other aromatics, and produce a hydrogenated product of enhanced volume and an olefin content less than 1 wt %. Such a product can be useful as, for example, a pipeline diluent. Thus, as the need to transport heavy crudes oils and bitumen grows, this process can address the increasing need for alternatives to the current diluents, mainly condensate and naphtha, used to lower the viscosity of these crudes and render them subject to transportation by pipeline.

Moreover, the present process can offer the possibility for a dual operation strategy, in which advantage can be taken of olefin saturation capability to produce diluents for pipelines when gasoline demand may be low, such as during the winter. Alternatively, when operating in normal gasoline mode, the durene content of the $C_{10}$ rich fraction can be reduced to produce gasoline meeting durene specifications.

Thus, in one aspect, the invention can relate to a process for the catalytic conversion of organic oxygenates to hydrocarbons, the process comprising: (a) contacting a feed comprising at least one organic oxygenate with a zeolite catalyst under conditions effective to produce a hydrocarbon product comprising aromatics, paraffins, and olefins; and (b) contacting at least a fraction of the hydrocarbon product containing $C_{4+}$ hydrocarbons, including at least part of the olefins, with hydrogen in the presence of a hydrogenation catalyst under conditions effective to decrease the olefin content of the $C_{4+}$-containing fraction and to produce a hydrogenated effluent containing less than 1 wt % olefins.

In a further aspect, the invention can relate to a continuous process for the catalytic conversion of organic oxygenates to hydrocarbons, the process comprising: (a) contacting a feed comprising at least one organic oxygenate with a crystalline aluminosilicate zeolite under conditions effective to produce a hydrocarbon product comprising aromatics, paraffins, and olefins; (b) contacting at least a fraction of the hydrocarbon product with hydrogen in the presence of a hydrogenation metal catalyst under conditions effective to reduce at least part of the durene in the fraction and to produce a hydrogenated effluent, wherein the process can periodically be switched between at least first and second operating modes, wherein, during the first operating mode, the contacting (b) can be conducted on the entire hydrocarbon product or a $C_{4+}$-containing fraction thereof, and wherein, during the second operating mode, the contacting (b) can be conducted on a 300-400° F.+ bottoms fraction of the hydrocarbon product.

In still yet a further aspect, the invention can relate to a pipelineable hydrocarbon composition comprising a mixture of a heavy crude oil, or fraction thereof, having an API gravity of less than 20 degrees and/or a viscosity at 25° C. greater than 400 centipoise and a diluent, wherein the diluent comprises at least part of the effluent obtained by hydrogenation of at least a fraction of the hydrocarbon product produced by the reaction of organic oxygenate with a crystalline aluminosilicate zeolite.

DETAILED DESCRIPTION OF THE EMBODIMENTS

Figure 1:
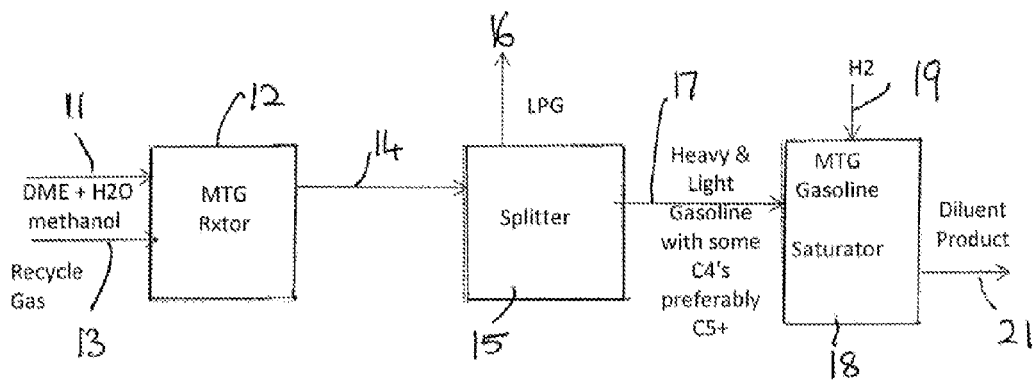
FIG. 1 is a simplified flow diagram of a process according to one embodiment of the invention operating in diluent mode.

As used herein, the term "$C_n$" hydrocarbon wherein n is a positive integer, e.g., 1, 2, 3, 4, 5, 6, 7, 8, 9, 10, 11, 12, means a hydrocarbon having n number of carbon atom(s) per molecule. The term "$C_n+$" hydrocarbon wherein n is a positive integer, e.g., 1, 2, 3, 4, 5, 6, 7, 8, 9, 10, 11, 12, as used herein, means a hydrocarbon having at least n number of carbon atom(s) per molecule. The term "$C_n-$" hydrocarbon wherein n is a positive integer, e.g., 1, 2, 3, 4, 5, 6, 7, 8, 9, 10, 11, 12, as used herein, means a hydrocarbon having no more than n number of carbon atom(s) per molecule.

Described herein is a process for converting organic oxygenates, particularly methanol and/or dimethyl ether, to hydrocarbons over zeolite catalysts. The process can produce valuable hydrocarbons, such as paraffins, olefins, aromatics, such as benzene, toluene, xylene, and normally durene, as well as combinations thereof. In the present process, at least a fraction of the hydrocarbon product containing $C_{4+}$ hydrocarbons, including at least part of the olefins in the product, can be hydrotreated to saturate at least part of the olefins and to produce a hydrogenated effluent containing less than 1 wt % olefins. In some cases, the hydrotreating process may be operated to reduce the level of durene, as well as the level of olefins, in the hydrocarbon product fraction, whereas, in other case, the process can advantageously be operated to result in no significant aromatics saturation. The resultant hydrogenated effluent can be useful as a diluent for heavy crude oils so as to facilitate their transportation, in particular their pumpability through pipelines.

In some embodiments, the process can be operated in at least first and second modes, with the process being periodically switched between the different operating modes according to site needs and customer demand. For example, in the first mode, the process may be operated as described above in which the entire hydrocarbon product or an aliquot thereof or a fraction of the hydrocarbon product containing $C_{4+}$ hydrocarbons, including at least part of the olefins in the product, can be hydrotreated to saturate at least part of the olefins and to produce a hydrogenated effluent containing less than 1 wt % olefins. This first mode of operation is referred to herein as "diluent mode operation" and can be employed during periods when gasoline demand may be low, for example during the winter. In the second mode of operation, the hydrocarbon product can initially be fractionated to separate a $C_{3-}$ lights component and a $C_{4+}$ gasoline component, before the remaining $C_{10}$-rich 300-400° F.+ bottoms fraction can be fed to the hydrotreater to reduce the durene content therein, typically to below 3 wt %. The resultant hydrogenated effluent can then normally be blended into the gasoline pool. This second mode of operation can be referred to herein as "gasoline mode operation" and can be employed during periods when gasoline demand is high, for example during the summer.

In some embodiments, the first and second operating modes of the process can be conducted using the same oxygenate conversion reactor, the same fractionation section, and the same hydrotreatment reactor. In this case, one difference between the first and second operating modes can be whether and how the hydrocarbon product from the oxygenate conversion reactor can be fractionated in the fractionation section before being passed to the hydrotreating reactor. In certain embodiments, the hydrogenation conditions may be different in the first and second operating modes, with more severe conditions (higher temperature and/or higher pressure) being employed in the second operating mode so as to reduce the durene. The overall process and the different operating modes are described in more detail herein and with reference to the accompanying drawings.

Oxygenate Conversion Reaction

The oxygenate conversion reaction employed in the present process can comprise contacting a feed containing one or more organic oxygenates with an aluminosilicate zeolite under conditions effective to convert the oxygenate(s) to hydrocarbons, particularly aromatics and/or olefins.

Suitable organic oxygenates for use in the present process can include, but are not limited to, oxygenates containing at least one $C_1$-$C_4$ alkyl group (e.g., oxygenates containing at least one $C_1$-$C_3$ alkyl group). Examples of such oxygenates can include methanol, dimethyl ether, $C_1$-$C_4$ alcohols, ethers with $C_1$-$C_4$ alkyl chains, including both asymmetric ethers containing $C_1$-$C_4$ alkyl chains (such as methyl ethyl ether, propyl butyl ether, or methyl propyl ether) and symmetric ethers (such as diethyl ether, dipropyl ether, and/or dibutyl ether), or combinations thereof. In certain advantageous embodiments, the oxygenate feed can include at least about 50 wt % of one or more suitable oxygenates, such as at least about 75 wt %, at least about 90 wt %, or at least about 95 wt %. In particular embodiments, the oxygenates can include or be methanol and/or dimethyl ether. The oxygenate feed can be derived from any convenient source. For example, the oxygenate feed can be formed by reforming of hydrocarbons in a natural gas feed to form synthesis gas ($H_2$, CO, $CO_2$, etc.), and then using the synthesis gas to form alcohols.

In some embodiments, the feed to the oxygenate conversion reaction may include some of the $C_4$ components and substantially all of the $C_{3-}$ components in the hydrocarbon product of the oxygenate conversion reaction. These components can typically be removed by fractionation from the hydrocarbon product before any hydrotreatment of the product and recycled to the oxygenate conversion reactor. The presence of these $C_{3-}$ and $C_4$ components in the oxygenate feed can advantageously increase the yield of $C_{5+}$ olefins in the hydrocarbon product.

It addition, it is to be noted that the oxygenate feed and/or conversion reaction environment can include water in various proportions (particularly when the feed comprises both an alkyl alcohol and its corresponding dialkyl ether, such as methanol and dimethyl ether). Conversion of oxygenates to aromatics and olefins can often result in production of water as a product, so the relative amounts of oxygenate (such as methanol and/or dimethyl ether) and water can vary within the reaction environment. Based on the temperatures present during methanol conversion, the water in the reaction environment can sometimes result in an effective "steaming" of a catalyst. Thus, a catalyst used for conversion of oxygenates to aromatics can preferably include or be a catalyst that substantially retains activity when steamed. Water may additionally or alternately be present in a feed, prior to contacting the zeolite catalyst. For example, in commercial processing of methanol to form gasoline, in order to control heat release within a reactor, an initial catalyst stage may be used to convert a portion of the methanol in a feed to dimethyl ether and water prior to contacting a zeolite catalyst for forming hydrocarbons.

The zeolite employed in the oxygenate conversion reaction may comprise at least one medium pore aluminosilicate zeolite, e.g., having a Constraint Index of 1-12 (as defined in U.S. Pat. No. 4,016,218). Suitable zeolites can include, but are not necessarily limited to, ZSM-5, ZSM-11, ZSM-12, ZSM-22, ZSM-23, ZSM-35, ZSM-48, and the like, and combinations thereof. ZSM-5 is described in detail in U.S. Pat. No. 3,702,886 and RE 29,948. ZSM-11 is described in detail in U.S. Pat. No. 3,709,979. ZSM-12 is described in U.S. Pat. No. 3,832,449. ZSM-22 is described in U.S. Pat. No. 4,556,477. ZSM-23 is described in U.S. Pat. No. 4,076,842. ZSM-35 is described in U.S. Pat. No. 4,016,245. ZSM-48 is more particularly described in U.S. Pat. No. 4,234,231. In certain advantageous embodiments, the zeolite can comprise or be ZSM-5.

In certain embodiments, the zeolite may have a silica to alumina molar ratio of at least 20, such as from about 20 to about 600, from about 30 to about 200, or from about 40 to about 80. For example, the silica to alumina molar ratio can be at least 40, such as at least about 60, at least about 80, at least about 100, or at least about 120. Additionally or alternately, the silica to alumina molar ratio can be about 600 or less, such as about 400 or less, or about 200 or less, or about 160 or less, or about 120 or less, or about 100 or less.

In particular embodiments, the silica to alumina molar ratio can be at least 40, for example from about 40 to about 200.

When used in the present process, the zeolite can advantageously be present at least partly in the hydrogen (active) form. Depending on the conditions used to synthesize the zeolite, getting to the hydrogen form may involve converting the zeolite from, for example, the alkali (sodium) form. This can readily be achieved, e.g., by ion exchange to convert the zeolite to the ammonium form, followed by calcination in air or an inert atmosphere, such as at a temperature from about 400° C. to about 700° C., to convert the ammonium form to the active hydrogen form. If an organic structure directing agent is used in the synthesis of the zeolite, calcination may be additionally desirable to remove and/or at least partially (and typically substantially) decompose the organic structure directing agent.

The zeolite can be combined with a binder, generally an inorganic oxide. Examples of suitable binders can include, but are not limited to, alumina, silica, silica-alumina, titania, ceria, magnesia, yttria, thoria, zirconia, and the like, and combinations thereof. In some cases, a non-acidic binder, such as silica may be preferred, Generally, the binder can be present in an amount between about 1 wt % and about 50 wt %, for example between about 5 wt % and about 40 wt %, from about 1 wt % to about 30 wt %, from about 1 wt % to about 20 wt %, or from about 1 wt % to about 10 wt %, of the total catalyst composition. Combining the zeolite and the binder can generally be achieved by standard or conventional processes, e.g., by mulling an aqueous mixture of the zeolite and binder and then extruding the mixture into catalyst pellets. An exemplary but not limiting process for producing zeolite extrudates using a silica binder is disclosed in, for example, U.S. Pat. No. 4,582,815, the entire contents of which are incorporated herein by reference (as well as specifically for the disclosure relating to silica-bound zeolite extrudates and their method of making). Alternatively, the catalyst employed in the present process can comprise a self-bound zeolite (i.e., without a binder).

To enhance the steam stability of the zeolite without excessive loss of its initial acid activity, the catalyst composition can already contain and/or can be treated to comprise phosphorus in an amount between about 0.01 wt % and about 20 wt % (on an elemental phosphorus basis), for example between about 0.05 wt % and about 5 wt %, of the total catalyst composition. The phosphorus can be added to the catalyst composition at any stage during synthesis of the zeolite or formulation of the zeolite and binder into the bound catalyst composition. Generally, phosphorus addition by treatment can be achieved by spraying and/or impregnating the final catalyst composition (and/or a precursor thereto) with a solution of a phosphorus compound. Suitable phosphorus treatment compounds can include, but are not limited to, phosphinic [$H_2PO(OH)$], phosphonic [$HPO(OH)_2$], and phosphoric [$PO(OH)_3$] acids, salts and esters of such acids, phosphorus halides, and the like, and combinations thereof. After phosphorus treatment, the catalyst can generally be calcined, e.g., in air, at a temperature about 400° C. to about 700° C., to convert the phosphorus to an appropriate (oxide) form.

Additionally or alternatively, the catalyst composition can include one or more transition metals. In one embodiment, the transition metal can include or be a Group 12 metal from the IUPAC periodic table (sometimes designated as Group IIB), such as Zn and/or Cd. The transition metal can be incorporated into the zeolite in any convenient form (such as in metal form, as an ion, as an organometallic compound, etc.) and by any convenient method, such as by impregnation and/or by ion exchange. After incorporation, the transition metal-enhanced catalyst can be treated in an oxidizing environment (air) and/or in an inert atmosphere at a temperature of about 400° C. to about 700° C. The amount of transition metal can be related to the molar amount of acidic and/or non-silica component (e.g., aluminum) present in the zeolite. In particular embodiments, the molar amount of the transition metal can correspond to about 0.1 to about 1.3 times the molar amount of acidic and/or non-silicon component (e.g., aluminum) in the zeolite. For example, the molar amount of transition metal can be about 0.1 times the molar amount of acidic and/or non-silica component in the zeolite, such as at least about 0.2 times, at least about 0.3 times, or at least about 0.4 times. Additionally or alternatively, the molar amount of transition metal can be about 1.3 times or less relative to the molar amount of acidic and/or non-silica component (e.g., aluminum) in the zeolite, such as about 1.2 times or less, about 1.0 times or less, or about 0.8 times or less. Still further additionally or alternatively, the amount of transition metal can be expressed as a weight percentage of the self-bound or unbound zeolite, such as having at least about 0.1 wt % of transition metal, at least about 0.25 wt %, at least about 0.5 wt %, at least about 0.75 wt %, or at least about 1.0 wt %. Yet further additionally or alternatively, the amount of transition metal can be about 20 wt % or less, such as about 10 wt % or less, about 5 wt % or less, about 2.0 wt % or less, about 1.5 wt % or less, about 1.2 wt % or less, about 1.1 wt % or less, or about 1.0 wt % or less.

The zeolite catalyst composition employed herein can further be characterized by at least one, for example at least two, and advantageously all of the following properties: (a) a mesoporosity (i.e., mesopore surface area or surface area external to the zeolite) of greater than about 20 m$^2$/g, such as greater than about 30 m$^2$/g; (b) a microporous surface area of at least about 340 m$^2$/g, such as at least about 350 m$^2$/g or at least about 370 m$^2$/g; and (c) a diffusivity for 2,2-dimethylbutane of greater than about $1.0 \times 10^{-2}$ sec$^{-1}$, such as greater than about $1.25 \times 10^{-2}$ sec$^{-1}$, when measured at a temperature of about 120° C. and a 2,2-dimethylbutane pressure of about 60 torr (about 8 kPa).

Of these properties, mesoporosity and diffusivity for 2,2-dimethylbutane are determined by a number of factors for a given zeolite, including the crystal size of the zeolite. Microporous surface area is determined by the pore size of the zeolite and the availability of the zeolite pores at the surfaces of the catalyst particles. Producing a zeolite catalyst with the desired low (minimum) mesoporosity, microporous surface area, and 2,2-dimethylbutane diffusivity is well within the expertise of anyone of ordinary skill in zeolite chemistry. It is noted that mesopore surface area and micropore surface area can be characterized, for example, using adsorption-desorption isotherm techniques within the expertise of one of skill in the art, such as the BET (Brunauer Emmett Teller) method.

It is noted that the micropore surface area can be characterized for zeolite crystals or a catalyst formed from the zeolite crystals. In various embodiments, the micropore surface area of a self-bound catalyst or a catalyst formulated with a separate binder can be at least about 340 m$^2$/g, such as at least about 350 m$^2$/g, at least about 370 m$^2$/g, or at least about 380 m$^2$/g. Typically, a formulation of zeolite crystals into catalyst particles (either self-bound or with a separate binder) can result in some loss of micropore surface area relative to the micropore surface area of the zeolite crystals. Thus, in order to provide a catalyst having the desired micropore surface area, the zeolite crystals can additionally or alternately have a micropore surface area of at least about 340 m$^2$/g, such as at least about 350 m$^2$/g, at least about 360 m$^2$/g, at least about 370 m$^2$/g, or at least about 380 m$^2$/g. As a practical matter, the micropore surface area of a zeolite crystal and/or a corresponding self-bound or bound catalyst as described herein can be less than about 1000 m$^2$/g, and typically less than about 750 m$^2$/g. Additionally or alternately, the micropore surface area of a catalyst (self-bound or with a separate binder) can be about 105% or less of the micropore surface area of the zeolite crystals in the catalyst, and typically about 100% or less of the micropore surface area of the zeolite crystals in the catalyst, such as from about 80% to about 100% of the micropore surface area of the zeolite crystals in the catalyst. For example, the micropore surface area of a catalyst can be at least about 80% of the micropore surface area of the zeolite crystals in the catalyst, such as at least about 85%, at least about 90%, at least about 95%, at least about 97%, or at least about 98%, and/or about 100% or less, about 99% or less, about 98% or less, about 97% or less, or about 95% or less.

Additionally or alternately, the diffusivity for 2,2-dimethylbutane of a catalyst (self-bound or with a separate binder) can be about 105% or less of the diffusivity for 2,2-dimethylbutane of the zeolite crystals in the catalyst, and typically about 100% or less of the diffusivity for 2,2-dimethylbutane of the zeolite crystals in the catalyst, such as from about 80% to about 100% of the diffusivity for 2,2-dimethylbutane of the zeolite crystals in the catalyst. For example, the diffusivity for 2,2-dimethylbutane of a catalyst can be at least about 80% of the diffusivity for 2,2-dimethylbutane of the zeolite crystals in the catalyst, such as at least about 85%, at least about 90%, at least about 95%, at least about 97%, or at least about 98%, and/or about 100% or less, about 99% or less, about 98% or less, about 97% or less, or about 95% or less.

In some embodiments, the zeolite catalyst can have an alpha value of at least about 10, such as at least about 20 or at least about 50. Alpha value is a measure of the acid activity of a zeolite catalyst as compared with a standard silica-alumina catalyst. The alpha test is described in U.S. Pat. No. 3,354,078; in the Journal of Catalysis at vol. 4, p. 527 (1965), vol. 6, p. 278 (1966), and vol. 61, p. 395 (1980), each incorporated herein by reference as to that description. The experimental conditions of the test used herein include a constant temperature of about 538° C. and a variable flow rate as described in detail in the Journal of Catalysis at vol. 61, p. 395. The higher alpha values correspond with a more active cracking catalyst.

Suitable conditions for converting organic oxygenate(s) to hydrocarbons over the zeolite catalysts described above can include temperatures between about 150° C. to about 600° C., total pressures between about 0.1 psia (about 0.7 kPaa) to about 500 psia (about 3.5 MPaa), and an oxygenate space velocity between about 0.1 h$^{-1}$ to about 20 h$^{-1}$, based on weight of oxygenate relative to weight of catalyst. For example, the temperature can be at least about 375° C., such as at least about 400° C., at least about 450° C., or at least about 460° C. Additionally or alternately, the temperature can be about 550° C. or less, such as about 525° C. or less or about 500° C. or less. The conversion can be conducted in any suitable reactor, such as a fixed bed, fluid bed, moving bed or tubular reactor.

Treatment of Oxygenate Conversion Reaction Product

In addition to residual oxygenate, the product of the oxygenate conversion reaction can comprise a wide range of valuable olefins and aromatics, typically together with some paraffins and some less desirable products, such as durene. Depending on the catalyst and conditions employed, the yield of aromatics and olefins can be at least 40 wt %, such as at least 50 wt %, at least 60 wt %, or at least 80 wt % (or even more) of the hydrocarbons in the product. Generally the hydrocarbon product can contain at least 8 wt %, such as at least 10 wt %, and sometimes as high as 15 wt % or 20 wt %, durene.

In accordance with the invention, at least a fraction of the hydrocarbon product containing $C_{4+}$ hydrocarbons, including at least part of the durene and olefins in the product, can be contacted with hydrogen in the presence of a hydrogenation catalyst under conditions effective to saturate at least part of the olefins and produce a hydrogenated effluent with an olefin content of less than 1 wt %, such as less than 0.5 wt % or less than 0.1 wt %. The olefin hydrogenation step may be accompanied by some saturation of the aromatics (including the durene) in $C_{4+}$-containing fraction, but the conditions can advantageously be arranged so that less than 10 wt %, such as less than 5 wt %, less than 1 wt %, or in some cases no measurable amount of the aromatics are saturated during the hydrogenation step.

In some embodiments, the entire hydrocarbon product of the oxygenate conversion reaction, or at least an aliquot of that product, can be sent to the hydrogenation step. In other embodiments, the hydrocarbon product may be pre-fractionated to remove most (such as at least 80 wt %) or all of the $C_{3-}$ hydrocarbon components before the remainder of the hydrocarbon product can be forwarded to the hydrogenation reactor. Typically, the $C_4$ content of the feed to the hydrogenation step can be at least 3 wt %, such as at least 5 wt %, and additionally or alternatively may be less than 10 wt %, such as less than 8 wt % or less than 6 wt %.

The hydrogenation catalyst employed in the olefin reduction step may comprise a hydrogenation metal or compound thereof on a refractory support. Suitable hydrogenation metals can come from Groups 6-12 of the IUPAC Periodic Table. Specific examples of operable hydrogenation components can include, but are not necessarily limited to, metals, oxides and sulfides of metals which fall into Group 6, including tungsten, chromium, molybdenum, and the like; Groups 7-10, including cobalt, nickel, platinum, palladium, rhenium, rhodium, and the like; and Group 12, including zinc, cadmium, and the like. Combinations of these metals and metal compounds can also/alternately be used.

Any known refractory material can be used as the support for the hydrogenation catalyst, including acidic supports such as silica-alumina, silica-magnesia, and silica-titania, as well as crystalline aluminosilicate zeolites that have been base exchanged so as to replace at least part of the alkali metal cations originally associated therewith with cations having an acidic function. In most embodiments, however, non-acidic supports can be preferred, such as silica, charcoal, as well as crystalline silicate, borosilicate, and/or aluminosilicate zeolites that have had their acidity reduced/eliminated by steaming, base exchange with alkali metal cations, or being synthesized so as to contain substantially no alumina/boron in the framework lattice.

Typical conditions for the hydrotreating step can comprise a temperature from ~150° C. to ~400° C., such as from ~200° C. to ~300° C., and a pressure from ~1 MPaa to ~15 MPaa, such as from ~2 MPaa to ~5 MPaa. In many embodiments, the hydrogen to hydrocarbon mole ratio can generally be from ~10 to ~3, such as from ~8 to ~5.

The effluent from hydrotreating step can comprise a broad boiling range hydrocarbon mixture of paraffins and aromatics, with less than 1 wt %, for example less than 0.5 wt %, olefins, an API Gravity between ~58 and ~84 degrees, and a final boiling point of less than ~220° C. and/or a T95 boiling point less than ~215° C. The resultant effluent can be useful as a diluent for heavy crude oils so as to increase their pumpability, either directly as produced in the hydrotreating reactor and/or, in some embodiments, after fractionation, to reduce the $C_4$ content of the effluent. Thus, for some applications, crude oil diluents may be required to have a $C_4$ content of less than 5 wt %.

The crude oil diluents produced by the present process can be combined with any crude oil or fraction thereof so as to reduce its density and/or viscosity and/or so as to improve its transportability through a pipeline. However, the present diluents can be particularly useful with heavy crude oils, such as bitumens and/or tars from oil sands, having an API Gravity of less than 20 degrees, such as less than 10 degrees, and/or a viscosity at 25° C. of greater than 400 cps, such as from 1000 to 10000 cps. By mixing the present diluents with such heavy crude oils, it can be possible to produce a pipelineable hydrocarbon composition having a viscosity at ~25° C. of less than ~400 cps, such as from ~50 cps to ~300 cps, e.g., without the need for the addition of additional naphtha or condensate. Typically the pipelineable hydrocarbon composition can comprise from about 10 wt % to about 70 wt %, such as from about 20 wt % to about 60 wt %, of the present diluent and from about 90 wt % to about 30 wt %, such as from about 80 wt % to about 40 wt %, of the heavy crude oil.

Referring now to FIG. 1, one embodiment of the present process is shown in which a mixture of methanol, dimethyl ether and water can be supplied via line 11 to an MTG reactor 12. Also feeding the reactor 12 can be line 13 for recycled $C_{3-}$ hydrocarbons. The reactor 12 can contain a phosphorus-stabilized ZSM-5 catalyst and can be maintained under conditions such that the methanol and dimethyl ether in the feed can be converted to a hydrocarbon product mixture rich in aromatics and olefins.

The hydrocarbon product mixture produced in the reactor 12 can be fed via line 14 to a fractionation section 15, where a $C_{3-}$ light gas can be removed via line 16 for recycle to the reactor 12 through line 13. The remaining $C_{4+}$ fraction of the hydrocarbon product mixture can then be fed via line 17 to a hydrotreating reactor 18, which can also receive a supply of hydrogen via line 19. The hydrotreating reactor 18 can contain a supported hydrogenation catalyst and can be maintained under conditions effective to saturate olefins in the product mixture and/or to produce a hydrogenated effluent containing less than 1 wt % olefins. The hydrogenated effluent can be recovered via line 21 for use as a crude oil diluent.

In some embodiments, the present process can be operated continuously as shown in FIG. 1. In other embodiments, the process can be operated in two or more different modes and be periodically switched between the different operating modes according to according to site needs and customer demand. In such latter embodiments, the mode of operation shown in FIG. 1, referred to herein as "diluent mode operation", may be adopted during periods when gasoline demand may be relatively low, while a separate mode of operation, referred to herein as "gasoline mode operation" can be adopted during periods when gasoline demand may be relatively high.

In gasoline mode operation, the hydrocarbon product from the MTG process can be initially fractionated to separate a $C_{3-}$ lights component and a $C_{4+}$ gasoline component, before the remaining $C_{10}$-rich 200-400° F.+ bottoms fraction can be fed to the hydrotreater to reduce the durene content therein. The hydrotreating conditions during gasoline mode operation may include a temperature from ~230° C. to ~350° C., such as from ~260° C. to ~315° C., a pressure from ~1 MPaa to ~15 MPaa, such as from ~2.5 MPaa to ~7 MPaa, and a hydrogen to hydrocarbon mole ratio from ~10 to ~4, such as from ~8 to ~5. Typically the hydrotreatment during gasoline mode operation can be operated so as to saturate at least ~30 wt %, such as at least ~50 wt % or at least ~75 wt % of the aromatics in the 200-400° F.+ bottoms fraction. Thus, whereas the MTG product may contain at least ~15 wt % durene, the hydrotreated product may contain less than ~10 wt % durene, such as less than ~5 wt % or less than ~3 wt %. It should be appreciated that the hydrotreatment during gasoline mode operation can also (normally) saturate most of the olefins in the bottoms fraction.

Figure 2:
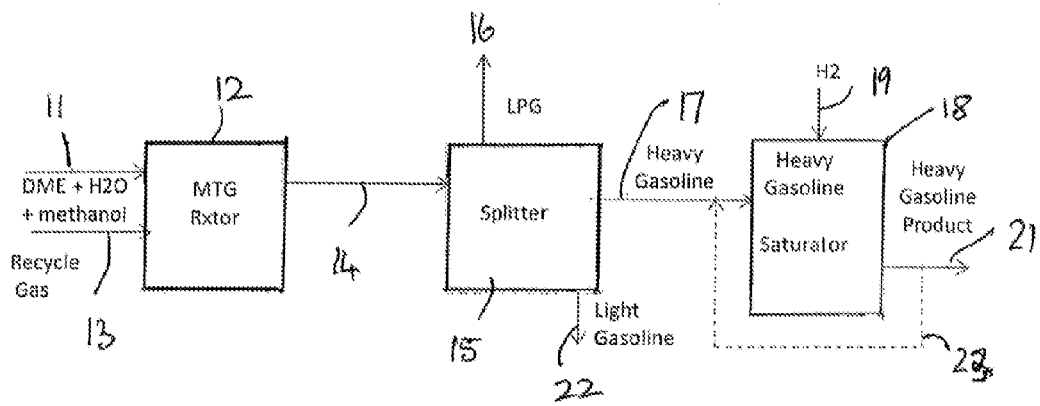
FIG. 2 is a simplified flow diagram of a process according to one embodiment of the invention operating in gasoline mode.

One embodiment of gasoline mode operation is shown in FIG. 2, which can differ from the diluent mode operation shown in FIG. 1 in that the fractionation section 15 can be operated to recover a light gasoline stream from the hydrocarbon product via line 22, in addition to the $C_{3-}$ light gas removed via line 16. The light gasoline stream can typically have an end point aim of ~340° F., so that the product fraction fed by line 17 to the hydrotreating reactor 18 can be a 340° F.+ bottoms fraction. The hydrogenated effluent removed from the hydrotreating reactor 18 via line can be considered a heavy gasoline stream, which can be blended into the gasoline pool. In certain embodiments, part of the heavy gasoline stream can be recycled via line 23 to the hydrotreating reactor to saturate or convert additional durene 18.

Additional Embodiments

The instant invention can further include one or more of the following embodiments.

Embodiment 1

A continuous process for the catalytic conversion of organic oxygenates to hydrocarbons, the process comprising: (a) contacting a feed comprising at least one organic oxygenate with a zeolite catalyst under conditions effective to produce a hydrocarbon product comprising aromatics, paraffins, and olefins; and (b) contacting at least a fraction of the hydrocarbon product with hydrogen in the presence of a hydrogenation metal catalyst under conditions effective to saturate at least part of the olefins in the fraction and produce a hydrogenated effluent, wherein the process is periodically switched between at least first and second operating modes, wherein, during the first operating mode, the contacting (b) is conducted on the entire hydrocarbon product or a $C_{4+}$-containing fraction thereof, and wherein, during the second operating mode, the contacting (b) is conducted on a 350-400° F.+ bottoms fraction of the hydrocarbon product.

Embodiment 2

A process for the catalytic conversion of organic oxygenates to hydrocarbons, the process comprising: (a) contacting a feed comprising at least one organic oxygenate with a zeolite catalyst under conditions effective to produce a hydrocarbon product comprising aromatics, paraffins, and olefins; and (b) contacting at least a fraction of the hydrocarbon product containing $C_{4+}$ hydrocarbons, including at least part of the olefins, with hydrogen in the presence of a hydrogenation catalyst under conditions effective to decrease the olefin content of the $C_{4+}$-containing fraction and to produce a hydrogenated effluent containing less than 1 wt % olefins, e.g., less than 0.5 wt % olefins.

Embodiment 3

The process of embodiment 1 or embodiment 2, wherein the zeolite catalyst comprises or is ZSM-5.

Embodiment 4

The process of any one of the previous embodiments, wherein the zeolite catalyst comprises phosphorus.

Embodiment 5

The process of any one of the previous embodiments, wherein the conditions in (a) comprise a temperature from ~150° C. to ~450° C. and a pressure from ~300 kPaa to ~30000 kPaa.

Embodiment 6

The process of any one of the previous embodiments, wherein the hydrogenation catalyst comprises a hydrogenation metal or compound thereof on a refractory support (e.g., a non-acidic refractory support).

Embodiment 7

The process of embodiment 6, wherein the hydrogenation metal comprises or is one or more of Pt, Pd, Ni, W, Co, and Mo.

Embodiment 8

The process of any one of the previous embodiments, wherein the conditions of the contacting (b) in the first operating mode comprise a temperature from ~150° C. to ~400° C. and a pressure from ~1 MPaa to ~15 MPaa and wherein the reaction produces a hydrogenated effluent containing less than 1 wt % olefins.

Embodiment 9

The process of any one of the previous embodiments, wherein the conditions of the contacting (b) in the second operating mode comprise a temperature from ~230° C. to ~350° C. and a pressure from ~1 MPaa to ~15 MPaa and saturate at least 30 wt % of the aromatics in the bottoms fraction.

Embodiment 10

The process of embodiment 9, wherein the hydrocarbon product produced in (a) comprises at least ~15 wt % durene, and wherein the hydrogenated effluent produced in the second operating mode of the contacting (b) comprises less than ~10 wt % durene.

Embodiment 11

The process of any one of the previous embodiments, wherein the at least one organic oxygenate comprises methanol and/or dimethyl ether.

Embodiment 12

The process of any one of embodiments 2-11, further comprising: (c) combining at least part of the hydrogenated effluent with a heavy crude oil to reduce density and viscosity and improve the pumpability of the crude oil.

Embodiment 13

The process of any one of embodiments 2-12, further comprising: (d) separating at least part of the hydrocarbon product into a $C_{3-}$-containing fraction and a $C_{4+}$-containing fraction comprising at least part of the olefins in the product; and (e) supplying at least part of the $C_{4+}$-containing fraction to the contacting (b).

Embodiment 14

A pipelineable hydrocarbon composition comprising a mixture of a heavy crude oil, or fraction thereof, having an API Gravity of less than 20 degrees and/or a viscosity at ~25° C. greater than 400 cps and a diluent, wherein the diluent comprises at least part of the effluent obtained by hydrogenation of at least a fraction of the hydrocarbon product produced by the reaction of organic oxygenate with a crystalline silicate, borosilicate, or aluminosilicate zeolite, wherein the composition optionally has a viscosity at ~25° C. of less than 400 cps.

Embodiment 15

The pipelineable hydrocarbon composition of embodiment 14, comprising from ~10 wt % to ~70 wt % of the diluent and from ~90 wt % to ~30 wt % of the heavy crude oil.

Embodiment 16

The pipelineable hydrocarbon composition of any one of embodiments 13-15, wherein the heavy crude oil is derived from oil sands.

EXAMPLES

The invention can be more particularly described with reference to the following non-limiting Example.

Example 1

Raw MTG gasoline was first generated in a fixed-bed, adiabatic reactor by contacting a mixture of dimethylether, water, and methanol with an extruded catalyst containing ~65 wt % H-ZSM-5 and ~35 wt % $Al_2O_3$ at ~300 psig (~2.2 MPaa). The inlet and outlet temperatures of the adiabatic reactor were ~600° F. (~316° C.) and ~775° F. (~413° C.), respectively.

About 100 g of raw MTG gasoline was loaded with ~8.0 g of a supported Pt—Pd catalyst in a stirred, heated ~600 mL batch autoclave. The autoclave was loaded subsequently with ~100 psig (~790 kPaa) of gaseous $H_2$, and thereafter stirred. The temperature of the autoclave was then increased to ~200° C. while stirring; the total system pressure was increased (with gaseous $H_2$) to ~600 psig (~4.2 MPaa) once the autoclave temperature had reached ~200° C. The treated liquid was removed from the autoclave after ~6 hours at ~250° C. and ~600 psig (~4.2 MPaa).

Relevant properties of the raw and hydrogen treated MTG gasoline and of a target crude oil diluent are shown in Table 1.

TABLE 1

| Sample | Olefin content (wt %) | Aromatics content (wt %) | Reid Vapor Pressure | Sulfur content (wt %) | Density @ 15° C. (kg/m³) |
|---|---|---|---|---|---|
| Raw MTG gasoline | 10.2 | 31.5 | 19.8 | 0 | 730 |
| Treated MTG gasoline (Example 1) | 0.0 | 27.2 | 16.7 | 0 | 700 |
| Diluent Target | 1.0 (max) | 2.0 vol % (min) | 103 (max) | 0.5 (max) | 650-799 |

While the illustrative embodiments of the invention have been described with particularity, it will be understood that various other modifications will be apparent to and may be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for the catalytic conversion of organic oxygenates to hydrocarbons, the process comprising:
    (a) contacting a feed comprising at least one organic oxygenate with a zeolite catalyst under conditions effective to produce a hydrocarbon product comprising aromatics, paraffins, and olefins;
    (b) contacting at least a fraction of the hydrocarbon product containing $C_{4+}$ hydrocarbons comprising at least 40 wt. % olefins and aromatics, with hydrogen in the presence of a hydrogenation catalyst under conditions effective to saturate less than 10 wt. % aromatics and to decrease the olefin content of the C4+-containing fraction and to produce a hydrogenated effluent containing less than 1 wt. % olefins; and
    (c) combining at least part of the hydrogenated effluent with a heavy crude oil to reduce density and/or viscosity and to improve the pumpability of the crude oil.

2. The process of claim 1, wherein the hydrogenated effluent contains less than 0.5 wt % olefins.

3. The process of claim 1, wherein the at least one organic oxygenate comprises methanol and/or dimethyl ether.

4. The process of claim 1, wherein the zeolite catalyst comprises ZSM-5.

5. The process of claim 1, wherein the zeolite catalyst comprises phosphorus.

6. The process of claim 1, wherein the conditions in (a) comprise a temperature from about 150° C. to about 600° C. and a pressure from about 300 kPaa to about 30000 kPaa.

7. The process of claim 1, wherein the hydrogenation catalyst comprises a hydrogenation metal or compound thereof on a refractory support.

8. The process of claim 7, wherein the hydrogenation metal comprises one or more of Pt, Pd, Ni, W, Co, and Mo.

9. The process of claim 7, wherein the refractory support is non-acidic.

10. The process of claim 1, wherein the conditions in (b) comprise a temperature from about 150° C. to about 400° C. and a pressure from about 1 MPaa to about 15 MPaa.

11. The process of claim 1, further comprising:
    (d) separating at least part of the hydrocarbon product into a $C_{3-}$-containing fraction and a $C_{4+}$-containing fraction comprising at least part of the olefins in the product; and
    (e1) supplying at least part of the $C_{4+}$-containing fraction to the contacting (b).

12. A continuous process for the catalytic conversion of organic oxygenates to hydrocarbons, the process comprising:
    (a) contacting a feed comprising at least one organic oxygenate with a zeolite catalyst under conditions effective to produce a hydrocarbon product comprising aromatics, paraffins, and olefins;
    (b) contacting at least a fraction of the hydrocarbon product containing $C_{4+}$ hydrocarbons comprising at least 40 wt. % olefins and aromatics, with hydrogen in the presence of a hydrogenation catalyst under conditions effective to saturate less than 10 wt. % aromatics and to decrease the olefin content of the C4+-containing fraction and to produce a hydrogenated effluent containing less than 1 wt. % olefins;
    (c) combining at least part of the hydrogenated effluent with a heavy crude oil to reduce density and/or viscosity and to improve the pumpability of the crude oil; and
    wherein the process is periodically switched between at least first and second operating modes,
    wherein, during the first operating mode, the contacting (b) is conducted on the entire hydrocarbon product or a C4+-containing fraction thereof, and
    wherein, during the second operating mode, the contacting (b) is conducted on a 350° F.+ bottoms fraction of the hydrocarbon product.

13. The process of claim 12, wherein the zeolite catalyst comprises ZSM-5.

14. The process of claim 12, wherein the zeolite catalyst comprises phosphorus.

15. The process of claim 12, wherein the conditions in (a) comprise a temperature from about 150° C. to about 450° C. and a pressure from about 300 kPaa to about 30000 kPaa.

16. The process of claim 12, wherein the hydrogenation catalyst comprises a hydrogenation metal or compound thereof on a refractory support.

17. The process of claim 16, wherein the hydrogenation metal comprises one or more of Pt, Pd, Ni, W, Co, and Mo.

18. The process of claim 16, wherein the refractory support is non-acidic.

19. The process of claim 12, wherein the conditions of the contacting (b) in the first operating mode comprise a temperature from about 150° C. to about 400° C. and a pressure from about 1 MPaa to about 15 MPaa and to produce a hydrogenated effluent containing less than 1 wt % olefins.

20. The process of claim 12, wherein the conditions of the contacting (b) in the second operating mode comprise a temperature from about 230° C. to about 350° C. and a pressure from about 1 MPaa to about 15 MPaa and to saturate at least 30 wt % of the aromatics in the bottoms fraction.

21. The process of claim 20, wherein the hydrocarbon product produced in (a) comprises at least 15 wt % durene, and wherein the hydrogenated effluent produced in the second operating mode of the contacting (b) comprises less than 10 wt % durene.

\* \* \* \* \*